(12) United States Patent
Yang et al.

(10) Patent No.: US 12,120,678 B2
(45) Date of Patent: Oct. 15, 2024

(54) RESOURCE INDICATION METHOD, RESOURCE DETERMINATION METHOD, APPARATUS, NETWORK SIDE DEVICE, AND TERMINAL

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Tuo Yang, Beijing (CN); Xiaodong Xu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 386 days.

(21) Appl. No.: 17/627,249

(22) PCT Filed: Jul. 23, 2020

(86) PCT No.: PCT/CN2020/103764
§ 371 (c)(1),
(2) Date: Jan. 14, 2022

(87) PCT Pub. No.: WO2021/023017
PCT Pub. Date: Feb. 11, 2021

(65) Prior Publication Data
US 2022/0264612 A1    Aug. 18, 2022

(30) Foreign Application Priority Data
Aug. 6, 2019  (CN) .......................... 201910722051.8

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0061* (2013.01); *H04L 1/1812* (2013.01);
(Continued)

(58) Field of Classification Search
CPC ......................... H04W 72/1273; H04W 72/23; H04L 1/0061; H04L 1/1812; H04L 5/0051; H04L 5/0053
See application file for complete search history.

(56) References Cited

U.S. PATENT DOCUMENTS

| 10,548,096 B2 | 1/2020 | Papasakellariou |
| 2014/0226552 A1 | 8/2014 | Niu |

(Continued)

FOREIGN PATENT DOCUMENTS

| CN | 101120610 A | 2/2008 |
| CN | 103988559 A | 8/2014 |

(Continued)

OTHER PUBLICATIONS

"On2-StepRACH Procedure", May 2019, 3GPP TSG RAN WG1 #97, R1-1906747, Reno, USA, Agenda item: 7.2.1.2, Source: Nokia, Nokia Shanghai Bell, 23 pgs.

(Continued)

*Primary Examiner* — Deepa Belur
(74) *Attorney, Agent, or Firm* — Cooper Legal Group, LLC (57) ABSTRACT

Provided in the present disclosure are a resource indication method, a resource determination method, an apparatus, a network side device, and a terminal. The method comprises: sending downlink control information (DCI), wherein the (Continued)

---

21 — Receive DCI, the DCI being used for indicating PUCCH resource for transmitting HARQ-ACK information for at least two terminals 22 — Determine the PUCCH resource for transmitting the HARQ-ACK information according to the DCI DCI is used for O indicating a PUCCH resource of HARQ-ACK information of at least two terminals.

9 Claims, 2 Drawing Sheets

(51) Int. Cl.
*H04L 1/1812* (2023.01)
*H04L 5/00* (2006.01)
*H04W 72/23* (2023.01)

(52) U.S. Cl.
CPC .......... *H04L 5/0051* (2013.01); *H04L 5/0053* (2013.01); *H04W 72/23* (2023.01)

(56) References Cited

U.S. PATENT DOCUMENTS

| | | | |
|---|---|---|---|
| 2014/0355493 A1 | 12/2014 | Niu | |
| 2016/0204906 A1* | 7/2016 | Cheng | H04L 1/1861 370/280 |
| 2017/0353273 A1 | 12/2017 | Zhang et al. | |
| 2018/0310257 A1 | 10/2018 | Papasakellariou | |
| 2019/0239214 A1* | 8/2019 | Yang | H04W 72/21 |
| 2019/0274131 A1 | 9/2019 | Yamazaki et al. | |
| 2019/0349971 A1* | 11/2019 | Yu | H04W 72/1273 |
| 2020/0137695 A1 | 4/2020 | Papasakellariou | |
| 2020/0229183 A1* | 7/2020 | Zhang | H04L 1/18 |
| 2021/0068115 A1* | 3/2021 | Gotoh | H04W 72/0453 |
| 2022/0046717 A1* | 2/2022 | Zhang | H04L 1/1861 |
| 2023/0006797 A1* | 1/2023 | Hu | H04W 72/23 |
| 2023/0136891 A1* | 5/2023 | Zhang | H04W 52/40 455/522 |
| 2023/0397213 A1* | 12/2023 | Blankenship | H04L 1/0073 |

FOREIGN PATENT DOCUMENTS

| | | |
|---|---|---|
| CN | 107251588 A | 10/2017 |
| CN | 108616339 A | 10/2018 |
| CN | 109802749 A | 5/2019 |
| EP | 3996455 A1 | 5/2022 |
| WO | 2013048514 A1 | 4/2013 |
| WO | 2016119209 A1 | 8/2016 |
| WO | 2018021298 A1 | 2/2018 |
| WO | 2018194436 A1 | 10/2018 |

OTHER PUBLICATIONS

"On 2-Step RACH Procedure", Apr. 2019, 3GPP TSG RAN WG1 #96bis, R1-1904716, Xi'an, China, Agenda item: 7.2.1.2, Source: Nokia, Nokia Shanghai Bell, 16 pgs.

International Search Report in the international application No. PCT/CN2020/103764, mailed on Sep. 27, 2020, 2 pgs.

English translation of the Written Opinion of the International Search Authority in the international application No. PCT/CN2020/103764, mailed on Sep. 27, 2020, 4 pgs.

Supplementary European Search Report in the European application No. 20850252.6, mailed on Aug. 2, 2022, 10 pgs.

* cited by examiner

RESOURCE INDICATION METHOD, RESOURCE DETERMINATION METHOD, APPARATUS, NETWORK SIDE DEVICE, AND TERMINAL

CROSS-REFERENCE TO RELATED APPLICATION

The application claims priority to Chinese Patent Application No. 201910722051.8, filed on Aug. 6, 2019, the disclosure of which is hereby incorporated by reference in its entirety.

TECHNICAL FIELD

The present disclosure relates to the technical field of communications, and in particular to a resource indication method and apparatus, a resource determination method and apparatus, a network side device, and a terminal.

BACKGROUND

In the 4th Generation (4G) Long Term Evolution (LTE), multicast/broadcast transmission is realized by introducing Multimedia Broadcast Multicast Service (MBMS) and Single Cell Point to Multipoint (SC-PTM) technologies. However, the MBMS and SC-PTM technologies in the related art are rarely introduced in real commercial networks, mainly because of the complexity and mode of their network structure, and services are provided still based on the mode of preset service in the related art.

Considering the SC-PTM mechanism in the related art and users' habits, if a network side may form, based on statistical information, terminals that use a same Application (APP) to watch a same live program in the current cell into a multicast group, and then provide multicast services to these users, instead of a service mode in which an independent resource is used for unicast for each user, the consumption of radio resources may be effectively reduced at least in a live scene. However, this combination mode will change the simple broadcast mode of SC-PTM; since in the related art, the LTE SC-PTM mode does not support Hybrid Automatic Repeat reQuest (HARQ), and the terminal does not need to feed back channel state information or HARQ-Acknowledge/Negative Acknowledgement (ACK/NACK) information, the network side cannot confirm that each interested user has received the service accurately.

The solution in the related art is to directly introduce an HARQ mechanism, and even a channel feedback mechanism under a multicast mechanism, and the network side realizes retransmission based on the received NACK information. However, how to obtain or indicate the resources used by the terminal for feedback, or how to use the network side to effectively distinguish the feedbacks from different terminals is a problem needing to be further solved.

For example, an SC-PTM scheme in the related art is still used in New Radio (NR). The network side uses a Physical Downlink Control Channel (PDCCH), of which Cyclic Redundancy Check (CRC) is scrambled by a public Radio Network Temporary Identifier (RNTI) and a Group-Radio Network Temporary Identifier (G-RNTI), to schedule a Physical Downlink Shared Channel (PDSCH) that carries a corresponding MBMS service. In order to realize HARQ feedback, a method is to directly require the terminal that receives the service to give feedback. In this case, the network side cannot determine the number of terminals that may be interested in receiving the service or the number of terminals that need to give HARQ feedback, nor a feedback resource used by each terminal.

This is because in NR related technologies, Physical Uplink Control Channel (PUCCH) feedback resource of a terminal is specified by its PDCCH. In NR, the PUCCH resource is indicated as follows: the network side configures multiple PUCCH resource sets for the terminal in advance, a PUCCH resource set includes multiple PUCCH resources, and Uplink Control Information (UCI) loads carried by the PUCCH resource sets are different from one another. The terminal first selects which PUCCH resource set to use according to its own UCI load, and then, an index of PUCCH resource used by the terminal in the PUCCH resource set is indicated by three bits in the PDCCH. If the terminal gives HARQ feedback according to an index of the PUCCH resource indicated in a public PDCCH, it is likely that the conflict of the PUCCH resources of multiple terminals be caused, and the network side cannot determine how many terminals that give NACK feedback and how many terminals that give ACK feedback, from the numerous PUCCH feedbacks in conflicts. If the HARQ feedback of different terminals to the PDSCH of multicast/broadcast on different PUCCH feedback resources is realized in the framework of related technologies, each terminal needs to be configured with a PUCCH resource set with orthogonal resources in advance. As a result, the network side needs to reserve a large number of PUCCH resources for different terminals, and different UE cannot share the same PUCCH resource set, resulting in a linear increase of PUCCH resource cost of the network side with the number of multicast/broadcast terminals.

SUMMARY

The purpose of embodiments of the present disclosure is to provide a resource indication method, a resource determination method and apparatus, a network side device, and a terminal, so as to solve the problems in the related art that the indicating mode of PUCCH feedback resources easily causes a network side cannot distinguish the transmitters of feedback information, and the PUCCH resource cost increases.

To solve the above problems, the embodiments of the present disclosure provide a resource indication method, which is applied to a network side device, and may include the following operation.

Downlink Control Information (DCI) is transmitted.

The DCI is used for indicating PUCCH resource for transmitting HARQ-ACK information for at least two terminals.

CRC of the DCI is scrambled by a first RNTI. The first RNTI is a common parameter of at least two terminals that receive the DCI.

The DCI includes a first information field, the first information field includes at least two PUCCH resource indicators, and each of the PUCCH resource indicators is used for indicating the PUCCH resource of a respective one of the terminals.

The method may further include the following operation.

The position of the PUCCH resource indicator of the terminal in the first information field is configured for the terminal through high-level signaling.

The DCI further includes a second information field, and the second information field conveys at least two PUCCH transmission power control commands. Each of the PUCCH transmission power control commands corresponds to a PUCCH resource indicated by a respective one of the PUCCH resource indicators in the first information field.

The DCI includes the first information field, and the first information field includes one PUCCH resource indicator.

The method may further include the following operation.

A first parameter is configured for the terminal. The first parameter is used for assisting the terminal in determining the PUCCH resource for transmitting the HARQ-ACK information.

The first parameter includes any one of the following:
identity information of the terminal;
an index of the terminal; or
an offset value of an index of the PUCCH resource of the terminal to an index of the PUCCH resource indicated by the PUCCH resource indicator conveyed by the first information field in the DCI.

The method may further include the following operation.

At least two sets of downlink configuration information are configured for the terminal through the high-level signaling. The downlink configuration information includes: downlink Demodulation Reference Signal (DMRS) configuration information and/or PDSCH configuration information.

The at least two sets of downlink configuration information include:
downlink configuration information applicable to the PDSCH scheduled by the DCI, of which CRC is scrambled by the first RNTI; and
downlink configuration information applicable to the PDSCH scheduled by the DCI, of which the CRC is scrambled by an RNTI other than the first RNTI.

The embodiments of the present disclosure further provide a resource determination method, which is applied to a terminal, and may include the following operations.

DCI is received. The DCI is used for indicating PUCCH resource for transmitting HARQ-ACK information for at least two terminals.

The PUCCH resource for transmitting the HARQ-ACK information is determined according to the DCI.

The CRC of the DCI is scrambled by the first RNTI. The first RNTI is the common parameter of at least two terminals that receive the DCI.

The DCI includes the first information field, the first information field includes at least two PUCCH resource indicators, and each of the PUCCH resource indicators is used for indicating the PUCCH resource of a respective one of the terminals.

The method may further include the following operation.

The position of the PUCCH resource indicator of the terminal in the first information field, which is configured by a network side device through high-level signaling, is received.

The operation that the PUCCH resource for transmitting the HARQ-ACK information is determined according to the DCI may include the following operations.

The PUCCH resource indicator of the terminal in the DCI is determined according to the position of the PUCCH resource indicator of the terminal in the first information field which is configured by the network side device.

The PUCCH resource of the terminal is determined according to the PUCCH resource indicator of the terminal.

The DCI further includes the second information field, and the second information field conveys at least two PUCCH transmission power control commands. Each of the PUCCH transmission power control commands corresponds to a PUCCH resource indicated by a respective one of the PUCCH resource indicators in the first information field.

The DCI includes the first information field, and the first information field includes a PUCCH resource indicator.

The operation that the PUCCH resource for transmitting the HARQ-ACK information is determined according to the DCI may include the following operation.

The PUCCH resource for transmitting the HARQ-ACK information of the terminal is determined according to the PUCCH resource indicator of the first information field.

The method may further include the following operation.

The first parameter of the terminal which is configured for the terminal by the network side device is received. The first parameter is used for assisting the terminal in determining the PUCCH resource for transmitting the HARQ-ACK information.

The first parameter includes any one of the following:
the identity information of the terminal;
the index of the terminal; or
the offset value of the index of the PUCCH resource of the terminal to the index of the PUCCH resource indicated by the PUCCH resource indicator conveyed by the first information field in the DCI.

The operation that the PUCCH resource for transmitting the HARQ-ACK information is determined according to the DCI may include the following operation.

The PUCCH resource for transmitting the HARQ-ACK information of the terminal is determined according to the first parameter of the terminal and the PUCCH resource indicator of the first information field.

The method may further include the following operation.

At least two sets of downlink configuration information which are configured for the terminal by the network side device through the high-level signaling are received. The downlink configuration information includes: the downlink DMRS configuration information and/or the PDSCH configuration information.

The at least two sets of downlink configuration information include:
the downlink configuration information applicable to the PDSCH scheduled by the DCI, of which CRC is scrambled by the first RNTI; and
the downlink configuration information applicable to the PDSCH scheduled by the DCI, of which the CRC is scrambled by an RNTI other than the first RNTI.

The embodiments of the present disclosure further provide a resource indication apparatus, which is applied to a network side device, and may include: a transmitting module.

The transmitting module is configured to transmit the DCI.

The DCI is used for indicating a PUCCH resource for transmitting HARQ-ACK information for at least two terminals.

The CRC of the DCI is scrambled by the first RNTI. The first RNTI is the common parameter of at least two terminals that receive the DCI.

The DCI includes the first information field, the first information field includes at least two PUCCH resource indicators, and each of the PUCCH resource indicators is used for indicating the PUCCH resource of a respective one of the terminals.

The device may further include: a first configuring module.

The first configuring module is configured to configure for the terminal the position of the PUCCH resource indicator of the terminal in the first information field through the high-level signaling.

The DCI further includes the second information field, and the second information field conveys at least two PUCCH transmission power control commands. Each of the PUCCH transmission power control commands corresponds to a PUCCH resource indicated by a respective one of the PUCCH resource indicators in the first information field.

The DCI includes the first information field, and the first information field includes a PUCCH resource indicator.

The device may further include a second configuring module.

The second configuring module is configured to configure the first parameter for the terminal. The first parameter is used for assisting the terminal in determining the PUCCH resource for transmitting the HARQ-ACK information.

The first parameter includes any one of the following:
the identity information of the terminal;
the index of the terminal; or
the offset value of the index of the PUCCH resource of the terminal to the index of the PUCCH resource indicated by the PUCCH resource indicator conveyed by the first information field in the DCI.

The device may further include: a third configuring module.

The third configuring module is configured to configure at least two sets of downlink configuration information for the terminal through the high-level signaling. The downlink configuration information includes: the downlink DMRS configuration information and/or the PDSCH configuration information.

The at least two sets of downlink configuration information include:
the downlink configuration information applicable to the PDSCH scheduled by the DCI, of which CRC is scrambled by the first RNTI; and
the downlink configuration information applicable to the PDSCH scheduled by the DCI, of which the CRC is scrambled by an RNTI other than the first RNTI.

The embodiments of the present disclosure further provide a network side device, which may include a processor and a transceiver. The transceiver is configured to receive and transmit data under control of the processor. The processor is configured to perform the following operations.

The DCI is transmitted.

The DCI is used for indicating a PUCCH resource for transmitting HARQ-ACK information for at least two terminals.

The CRC of the DCI is scrambled by the first RNTI. The first RNTI is the common parameter of at least two terminals that receive the DCI.

The DCI includes the first information field, the first information field includes at least two PUCCH resource indicators, and each of the PUCCH resource indicators is used for indicating the PUCCH resource of a respective one of the terminals.

The processor is further configured to:
configure for the terminal the position of the PUCCH resource indicator of the terminal in the first information field through the high-level signaling.

The DCI also includes the second information field, and the second information field conveys at least two PUCCH transmission power control commands. Each of the PUCCH transmission power control commands corresponds to a PUCCH resource indicated by a respective one of the PUCCH resource indicators in the first information field.

The DCI includes the first information field, and the first information field includes a PUCCH resource indicator.

The processor is further configured to:
configure the first parameter for the terminal. The first parameter is used for assisting the terminal in determining the PUCCH resource for transmitting the HARQ-ACK information.

The first parameter includes any one of the following:
the identity information of the terminal;
the index of the terminal; or
the offset value of the index of the PUCCH resource of the terminal to the index of the PUCCH resource indicated by the PUCCH resource indicator conveyed by the first information field in the DCI.

The processor is further configured to:
configure at least two sets of downlink configuration information for the terminal through the high-level signaling. The downlink configuration information includes: the downlink DMRS configuration information and/or the PDSCH configuration information.

The at least two sets of downlink configuration information include:
the downlink configuration information applicable to the PDSCH scheduled by the DCI, of which CRC is scrambled by the first RNTI; and
the downlink configuration information applicable to the PDSCH scheduled by the DCI, of which the CRC is scrambled by an RNTI other than the first RNTI.

The embodiments of the present disclosure also provide a resource determination apparatus, which is applied to a terminal, and may include: a receiving module and a determining module.

The receiving module is configured to receive the DCI. The DCI is used for indicating a PUCCH resource for transmitting HARQ-ACK information for at least two terminals.

The determining module is configured to determine the PUCCH resource for transmitting the HARQ-ACK information according to the DCI.

The CRC of the DCI is scrambled by the first RNTI. The first RNTI is the common parameter of at least two terminals that receive the DCI.

The DCI includes the first information field, the first information field includes at least two PUCCH resource indicators, and each of the PUCCH resource indicators is used for indicating the PUCCH resource of a respective one of the terminals.

The apparatus may further include: a first receiving module.

The first receiving module is configured to receive the position of the PUCCH resource indicator of the terminal in the first information field, which is configured by the network side device through the high-level signaling.

The determining module may include: a first determining submodule and a second determining submodule.

The first determining submodule is configured to determine the PUCCH resource indicator of the terminal in the DCI according to the position of the PUCCH resource indicator of the terminal in the first information field which is configured by the network side device.

The second determining submodule is configured to determine the PUCCH resource of the terminal according to the PUCCH resource indicator of the terminal.

The DCI further includes the second information field, and the second information field conveys at least two PUCCH transmission power control commands. Each of the PUCCH transmission power control commands corresponds to a PUCCH resource indicated by a respective one of the PUCCH resource indicators in the first information field.

The DCI includes the first information field, and the first information field includes a PUCCH resource indicator.

The determining module may include: a third determining submodule.

The third determining submodule is configured to determine the PUCCH resource for transmitting the HARQ-ACK information of the terminal according to the PUCCH resource indicator of the first information field.

The apparatus may further include a second receiving module.

The second receiving module is configured to receive the first parameter of the terminal which is configured for the terminal by the network side device. The first parameter is used for assisting the terminal in determining the PUCCH resource for transmitting the HARQ-ACK information.

The first parameter includes any one of the following:

the identity information of the terminal;

the index of the terminal; or the offset value of the index of the PUCCH resource of the terminal to the index of the PUCCH resource indicated by the PUCCH resource indicator conveyed by the first information field in the DCI.

The determining module may include: a fourth determining submodule.

The fourth determining submodule is configured to determine the PUCCH resource for transmitting the HARQ-ACK information of the terminal according to the first parameter of the terminal and the PUCCH resource indicator of the first information field.

The device may also include: a third receiving module.

The third receiving module is configured to receive at least two sets of downlink configuration information which are configured for the terminal by the network side device through the high-level signaling. The downlink configuration information includes: the downlink DMRS configuration information and/or the PDSCH configuration information.

The at least two sets of downlink configuration information include:

the downlink configuration information applicable to the PDSCH scheduled by the DCI, of which CRC is scrambled by the first RNTI; and the downlink configuration information applicable to the PDSCH scheduled by the DCI, of which the CRC is scrambled by an RNTI other than the first RNTI.

The embodiments of the present disclosure also provide a terminal, which may include a processor and a transceiver. The transceiver is configured to receive and transmit data under control of the processor. The processor is configured to perform the following operations.

DCI is received. The DCI is used for indicating a PUCCH resource for transmitting HARQ-ACK information for at least two terminals.

The PUCCH resource for transmitting the HARQ-ACK information is determined according to the DCI.

The CRC of the DCI is scrambled by the first RNTI. The first RNTI is the common parameter of at least two terminals that receive the DCI.

The DCI includes the first information field, the first information field includes at least two PUCCH resource indicators, and each of the PUCCH resource indicators is used for indicating the PUCCH resource of a respective one of the terminals.

The processor is further configured to:

receive the position of the PUCCH resource indicator of the terminal in the first information field, which is configured by the network side device through the high-level signaling.

The processor is further configured to:

determine the PUCCH resource indicator of the terminal in the DCI according to the position of the PUCCH resource indicator of the terminal in the first information field which is configured by the network side device; and determine the PUCCH resource of the terminal according to the PUCCH resource indicator of the terminal.

The DCI further includes the second information field, and the second information field conveys at least two PUCCH transmission power control commands. Each of the PUCCH transmission power control commands corresponds to a PUCCH resource indicated by a respective one of the PUCCH resource indicators in the first information field.

The DCI includes the first information field, and the first information field includes a PUCCH resource indicator.

The processor is further configured to:

determine the PUCCH resource for transmitting the HARQ-ACK information of the terminal according to the PUCCH resource indicator of the first information field.

The processor is further configured to:

receive the first parameter of the terminal which is configured for the terminal by the network side device. The first parameter is used for assisting the terminal in determining the PUCCH resource for transmitting the HARQ-ACK information.

The first parameter includes any one of the following:

the identity information of the terminal;

the index of the terminal; or the offset value of the index of the PUCCH resource of the terminal to the index of the PUCCH resource indicated by the PUCCH resource indicator conveyed by the first information field in the DCI.

The processor is further configured to:

determine the PUCCH resource for transmitting the HARQ-ACK information of the terminal according to the first parameter of the terminal and the PUCCH resource indicator of the first information field.

The processor is further configured to:

receive at least two sets of downlink configuration information which are configured for the terminal by the network side device through the high-level signaling. The downlink configuration information includes: the downlink DMRS configuration information and/or the PDSCH configuration information.

The at least two sets of downlink configuration information include:

the downlink configuration information applicable to the PDSCH scheduled by the DCI, of which CRC is scrambled by the first RNTI; and the downlink configuration information applicable to the PDSCH scheduled by the DCI, of which the CRC is scrambled by an RNTI other than the first RNTI.

The embodiments of the present disclosure further provide a communication device, which may include: a memory, a processor and a program stored in the memory and capable of running on the processor. The processor, when executing the program, implements the above resource indication method; or, the processor, when executing the program, implements the above resource determination method.

The embodiments of the present disclosure also provide a computer-readable storage medium, in which a computer program is stored. The processor, when executed by the processor, implements the steps in the above resource indication method; or, the processor, when executed by the processor, implements the above resource determination method.

The above technical solution of the present disclosure at least has the following beneficial effects.

In the resource indication method, the resource determination method, the apparatus, the network side device, and the terminal of the embodiments of the present disclosure, the indication of the PUCCH resources of multiple terminals is realized through one piece of DCI, and the network side does not need to configure a PUCCH resource set with orthogonal resources for multiple terminals, and meanwhile, the conflict of PUCCH feedback resources of the terminals can be avoided.

DETAILED DESCRIPTION

For making the technical problem to be solved, technical solutions and advantages of the present disclosure clearer, a detailed description is given below in combination with the accompanying drawings and the specific embodiments.

Figure 1:
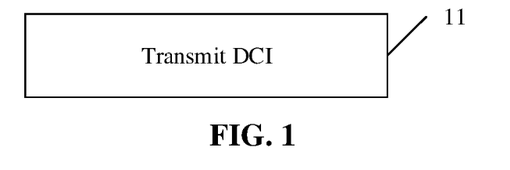
FIG. 1 illustrates a schematic diagram of steps in a resource indication method according to an embodiment of the present disclosure.

As shown in FIG. 1, the embodiments of the present disclosure provide a resource indication method, which is applied to a network side device, and may include the following step.

At S11, DCI is transmitted.

The DCI is used for indicating a PUCCH resource for transmitting HARQ-ACK information for at least two terminals.

In the embodiments of the present disclosure, a network side device conveys and transmits the DCI through a PDCCH.

Optionally, CRC of the DCI is scrambled by a first RNTI. The first RNTI is a common parameter of at least two terminals that receive the DCI. For example, for a multicast service, the first RNTI is the common parameter of all terminals in a terminal group. All terminals in the terminal group detect the PDCCH according to the first RNTI.

In other words, multiple terminals detect a PDCCH (carrying the DCI), and the common PDCCH schedules a common PDSCH resource. The DCI conveyed by the common PDCCH is used for indicating the PUCCH resource to be used for transmitting HARQ-ACK information for at least two terminals. The terminal performs HARQ feedback to the received PDSCH on the PUCCH resource indicated by the DCI.

It is to be noted that, in the embodiments of the present disclosure, a method for indicating the PUCCH resource for the terminal to transmit the HARQ-ACK information is as follows.

The network side configures at most four PUCCH resource sets for the terminal in advance, a PUCCH resource set includes multiple PUCCH resources, and UCI load carried by each PUCCH resource set is different from that carried by another PUCCH resource set. For the first PUCCH resource set, that is, the resource set of which pucch-ResourceSetId is equal to 0, at most two UCI information bits may be transmitted. For the second PUCCH resource set, that is, the resource set of which pucch-ResourceSetId is equal to 1, more than 2 to less than or equal to N2 UCI information bits may be transmitted. For the third PUCCH resource set, that is, the resource set of which pucch-ResourceSetId is equal to 2, more than N2 to less than or equal to N3 UCI information bits may be transmitted. For the Fourth PUCCH resource set, that is, the resource set of which pucch-ResourceSetId is equal to 3, more than N3 to less than or equal to 1706 UCI information bits may be transmitted. N2 and N3 are configured by the network side through RRC signaling.

For the first PUCCH resource set, the network side may configure at most 32 PUCCH resources. For the second PUCCH resource set, the third PUCCH resource set, and the fourth PUCCH resource set, the network side may configure at most 8 PUCCH resources.

The terminal first selects which PUCCH resource set to use according to its own UCI load, and then, determines which PUCCH resource in the selected PUCCH resource set to use according to the indication of the DCI of the received PDCCH.

The embodiments of the present disclosure provide two ways of indicating the PUCCH resource of different terminals, as follows.

The first way is explicit indication, that is, the DCI includes a first information field, the first information field includes at least two PUCCH resource indicators, and each of the PUCCH resource indicators is used for indicating the PUCCH resource of a respective one of the terminals. Specifically, the PUCCH resource indicator is used for indicating an index of the PUCCH resource.

In other words, the first information field of the DCI is extended, and two PUCCH resource indicators are included in the first information field, corresponding to different terminals respectively.

Further, the method may further include the following operation.

The position of the PUCCH resource indicator of the terminal in the first information field is configured for the terminal through high-level signaling.

For example, if the first information field in the DCI has a length of 15 bits, and conveys five 3-bit PUCCH resource indicators, and the network side configures that the position of the PUCCH resource indicator of the terminal #1 is at 3 bits from No. 0 to No. 2 of the first information field, then the terminal #1 determines the index of the PUCCH resource according to the PUCCH resource indicator at 3 bits from No. 0 to No. 2 of the first information field of the DCI received, thereby determining the PUCCH resource for transmitting the HARQ-ACK information.

Optionally, the DCI further includes a second information field, and the second information field conveys at least two PUCCH transmission power control commands. Each of the PUCCH transmission power control commands corresponds to a PUCCH resource indicated by a respective one of the PUCCH resource indicators in the first information field.

Because the first information field of the DCI includes the PUCCH resource indicators of multiple terminals, in order to configure different transmission powers for different terminals, the DCI further includes the second information field, each PUCCH transmission power indication command in the second information field corresponds to a PUCCH indicated by a respective one of the PUCCH resource indicators in the first information field.

The second way is implicit indication, that is, the DCI includes the first information field, and the first information field includes one PUCCH resource indicator. Specifically, the PUCCH resource indicator is used for indicating the index of the PUCCH resource.

Further, the method may further include the following operation.

A first parameter is configured for the terminal. The first parameter is used for assisting the terminal in determining the PUCCH resource for transmitting the HARQ-ACK information.

The first parameter includes any one of the following:
identity information of the terminal, for example, a Cell RNTI (C-RNTI) or a 5G S-Temporary Mobile Subscription Identifier (5G-S-TMSI) or a 5G Globally Unique Temporary Identifier (5G-GUTI) of the terminal;
an index of the terminal, that is, an index of the terminal in a terminal group or a parameter configured by the network side for identifying the terminal; or
an offset value of an index of the PUCCH resource of the terminal to an index of the PUCCH resource indicated by the PUCCH resource indicator conveyed by the first information field in the DCI.

In the embodiments of the present disclosure, the terminal may determine its own PUCCH resource according to the first parameter and the PUCCH resource indicator of the first information field. Because different terminals generally have different first parameters, the conflict of the PUCCH resources of different terminals can be avoided.

It is to be noted that, if the terminal that receives the DCI is the first terminal in a terminal group or the terminal with a specific index, the terminal may directly determine that the PUCCH resource indicated by the PUCCH resource indicator in the first information field of the DCI is the PUCCH resource for transmitting the HARQ-ACK information of the terminal without referring to the first parameter.

As an optional embodiment, the method may further include the following operations.

At least two sets of downlink configuration information are configured for the terminal through the high-level signaling. The downlink configuration information includes: downlink DMRS configuration information and/or PDSCH configuration information.

The at least two sets of downlink configuration information include:
downlink configuration information applicable to the PDSCH scheduled by the DCI, of which CRC is scrambled by the first RNTI, which may also be referred to as downlink configuration information applicable to a multicast or broadcast service; and
downlink configuration information applicable to the PDSCH scheduled by the DCI, of which the CRC is scrambled by an RNTI other than the first RNTI, which may also be referred to as downlink configuration information applicable to a unicast service.

For example, the network side device configures two sets of downlink DMRS configuration information for the terminal through the high-level signaling. The length of the DMRS in the first set of downlink DMRS configuration information is two symbols, an additional DMRS is configured, and the first set of downlink DMRS configuration information is applicable to the PDSCH scheduled by the DCI, of which CRC is scrambled by the first RNTI. The length of the DMRS in the second set of downlink DMRS configuration information is one symbol, no additional DMRS is configured, and the second set of downlink DMRS configuration information is applicable to the PDSCH scheduled by the DCI, of which the CRC is scrambled by an RNTI (such as the C-RNTI) other than the first RNTI.

To sum up, in the embodiments of the present disclosure, the network side device realizes the indication of the PUCCH resources of multiple terminals through one piece of DCI, and the network side does not need to configure the PUCCH resource set with orthogonal resources for multiple terminals, and meanwhile, the conflict of PUCCH feedback resources of the terminals can be avoided.

Figure 2:
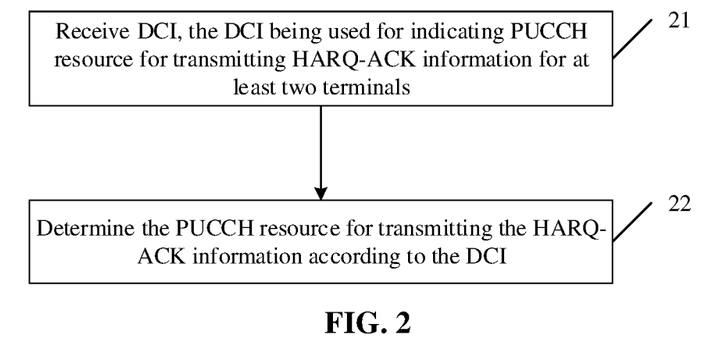
FIG. 2 illustrates a flowchart of steps in a resource determination method according to an embodiment of the present disclosure.

As shown in FIG. 2, the embodiments of the present disclosure also provide a resource determination method, which is applied to a terminal, and may include the following steps.

At S21, DCI is received. The DCI is used for indicating PUCCH resource for transmitting HARQ-ACK information for at least two terminals.

At S22, the PUCCH resource for transmitting the HARQ-ACK information is determined according to the DCI.

In the embodiments of the present disclosure, the network side device conveys and transmits the DCI through the PDCCH.

Optionally, the CRC of the DCI is scrambled by the first RNTI. The first RNTI is the common parameter of at least two terminals that receive the DCI. For example, for a multicast service, the first RNTI is the common parameter of all terminals in a terminal group. All terminals in the terminal group detect the PDCCH according to the first RNTI.

In other words, multiple terminals detect a PDCCH (carrying the DCI), and the common PDCCH schedules a common PDSCH resource. The DCI conveyed by the common PDCCH is used for indicating the PUCCH resource for transmitting HARQ-ACK information for at least two terminals. The terminal performs the HARQ feedback to the received PDSCH on the PUCCH resource indicated by the DCI.

It is to be noted that, in the embodiments of the present disclosure, the method for indicating the PUCCH resource for the terminal to transmit the HARQ-ACK information is as follows.

The network side configures at most four PUCCH resource sets for the terminal in advance, a PUCCH resource set includes multiple PUCCH resources, and UCI load carried by each PUCCH resource set is different from that carried by another PUCCH resource set. For the first PUCCH resource set, that is, the resource set of which pucch-ResourceSetId is equal to 0, at most two UCI information bits may be transmitted. For the second PUCCH resource set, that is, the resource set of which pucch-ResourceSetId is equal to 1, more than 2 to less than or equal to N2 UCI information bits may be transmitted. For the third PUCCH resource set, that is, the resource set of which pucch-ResourceSetId is equal to 2, more than N2 to less than or equal to N3 UCI information bits may be transmitted. For the Fourth PUCCH resource set, that is, the resource set of which pucch-ResourceSetId is equal to 3, more than N3 to less than or equal to 1706 UCI information bits may be transmitted. N2 and N3 are configured by the network side through RRC signaling.

For the first PUCCH resource set, the network side may configure at most 32 PUCCH resources. For the second PUCCH resource set, the third PUCCH resource set, and the fourth PUCCH resource set, the network side may configure at most 8 PUCCH resources.

The terminal first selects which PUCCH resource set to use according to its own UCI load, and then, determines which PUCCH resource in the selected PUCCH resource set to use according to the indication of the DCI of the received PDCCH.

The embodiments of the present disclosure provide two ways of indicating the PUCCH resource of different terminals, as follows.

The first way is explicit indication, that is, the DCI includes a first information field, the first information field includes at least two PUCCH resource indicators, and each of the PUCCH resource indicators is used for indicating the PUCCH resource of a respective one of the terminals. Specifically, the PUCCH resource indicator is used for indicating an index of the PUCCH resource.

In other words, the first information field of the DCI is extended, and two PUCCH resource indicators are included in the first information field, respectively corresponding to different terminals.

Further, the method may further include the following operation.

The position of the PUCCH resource indicator of the terminal in the first information field, which is configured by the network side device through the high-level signaling, is received.

Correspondingly, S22 may include the following operations.

The PUCCH resource indicator of the terminal in the DCI is determined according to the position of the PUCCH resource indicator of the terminal in the first information field which is configured by the network side device.

The PUCCH resource of the terminal is determined according to the PUCCH resource indicator of the terminal.

For example, if the first information field in the DCI has a length of 15 bits, and conveys five 3-bit PUCCH resource indicators, and the network side configures that the position of the PUCCH resource indicator of the terminal #1 is at 3 bits from No. 0 to No. 2 of the first information field, then the terminal #1 determines the index of the PUCCH resource according to the PUCCH resource indicator at 3 bits from No. 0 to No. 2 of the first information field of the DCI received, thereby determining the PUCCH resource for transmitting the HARQ-ACK information.

Optionally, the DCI also includes the second information field, and the second information field conveys at least two PUCCH transmission power control commands. Each of the PUCCH transmission power control commands corresponds to a PUCCH resource indicated by a respective one of the PUCCH resource indicators in the first information field.

Because the first information field of the DCI includes the PUCCH resource indicators of multiple terminals, in order to configure different transmission powers for different terminals, the DCI further includes the second information field, each PUCCH transmission power indication command in the second information field corresponds to a PUCCH indicated by a respective one of the PUCCH resource indicators in the first information field.

The second way is implicit indication, that is, the DCI includes the first information field, and the first information field includes one PUCCH resource indicator. Specifically, the PUCCH resource indicator is used for indicating the index of the PUCCH resource.

Correspondingly, S22 may include the following operation.

The PUCCH resource for transmitting the HARQ-ACK information of the terminal is determined according to the PUCCH resource indicator of the first information field.

It is to be noted that, if the terminal that receives the DCI is the first terminal in a terminal group or the terminal with a specific index, the terminal may directly determine that the PUCCH resource indicated by the PUCCH resource indicator in the first information field of the DCI is the PUCCH resource for transmitting the HARQ-ACK information of the terminal without referring to the first parameter.

Further, the method may further include the following operation.

The first parameter of the terminal which is configured for the terminal by the network side device is received. The first parameter is used for assisting the terminal in determining the PUCCH resource for transmitting the HARQ-ACK information.

The first parameter includes any one of the following:
the identity information of the terminal, for example, the C-RNTI or the 5G-S-TMSI or the 5G-GUTI of the terminal;
the index of the terminal, that is, the index of the terminal in a terminal group or the parameter configured by the network side for identifying the terminal; or
the offset value of the index of the PUCCH resource of the terminal to the index of the PUCCH resource indicated by the PUCCH resource indicator conveyed by the first information field in the DCI.

Correspondingly, S22 may include the following operation.
the PUCCH resource for transmitting the HARQ-ACK information of the terminal is determined according to the first parameter of the terminal and the PUCCH resource indicator of the first information field.

In the embodiments of the present disclosure, the terminal may determine its own PUCCH resource according to the first parameter and the PUCCH resource indicator of the first information field. Because different terminals are generally have different first parameters, the conflict of the PUCCH resources of different terminals can be avoided.

In order to describe the second way more clearly, the second way is described in detail below through several examples.

First Example

For the PUCCH resource set including less than or equal to 8 PUCCH resources, which is configured through the high-level signaling, the index of the PUCCH resource for transmitting the HARQ-ACK information calculated by the terminal finally is PUCCH index, which is calculated as follows:

PUCCH index=$(\Delta_{PRI}+$UE ID mod 8)mod 8;

where, $\Delta_{PRI}$ is the value of the PUCCH resource indicator conveyed by the first information field in the DCI, and UE ID is the identity information of the terminal.

Second Example

For the PUCCH resource set including more than 8 PUCCH resources, which is configured through the high-level signaling, the index of the PUCCH resource for transmitting the HARQ-ACK information calculated by the terminal finally is PUCCH index, which is calculated as follows:

PUCCH index=$(r_{PUCCH}$+UE IDmod 32)mod 32;

where, $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil + & \text{if } \Delta_{PRI} \geq R_{PUCCH} \bmod 8 \\ R_{PUCCH} \bmod 8 & \end{cases}$$

where UE ID is the identity information of the terminal, $N_{CCE,p}$ is the number of Control Channel Elements (CCEs) of a Control Resource Set (CORESET) where the PDCCH received by the terminal is located, $n_{CCE,p}$ is the index of the first CCE receiving the PDCCH, $\Delta_{PRI}$ is the value of the PUCCH resource indicator conveyed by the first information field in the DCI, and $R_{PUCCH}$ is the number of PUCCH resources included in the PUCCH resource set.

Third Example

For the PUCCH resource set including less than or equal to 8 PUCCH resources, which is configured through the high-level signaling, the index of the PUCCH resource for transmitting the HARQ-ACK information calculated by the terminal finally is PUCCH index, which is calculated as follows:

PUCCH index=$(\Delta_{PRI}$+UE ID mod $N$)mod $N$, where $\Delta_{PRI}$ is the value of the PUCCH resource indicator conveyed by the first information field in the DCI, UE ID is the identity information of the terminal, and N is the number of PUCCH resources in the PUCCH resource set configured through the high-level signaling.

Fourth Example

For the PUCCH resource set including more than 8 PUCCH resources, which is configured through the high-level signaling, the index of the PUCCH resource for transmitting the HARQ-ACK information calculated by the terminal finally is PUCCH index, which is calculated as follows:

PUCCH index=$(r_{PUCCH}$+UE ID mod $N$)mod $N$, where, $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil + & \text{if } \Delta_{PRI} \geq R_{PUCCH} \bmod 8 \\ R_{PUCCH} \bmod 8 & \end{cases}$$

where UE ID is the identity information of the terminal, N is the number of PUCCH resources in the PUCCH resource set configured through the high-level signaling, $N_{CCE,p}$ is the number of CCEs of the CORESET where the PDCCH received by the terminal is, $n_{CCE,p}$ is the index of the first CCE receiving the PDCCH, $\Delta_{PRI}$ is the value of the PUCCH resource indicator conveyed by the first information field in the DCI, and $R_{PUCCH}$ is the number of PUCCH resources included in the PUCCH resource set.

Fifth Example

For the PUCCH resource set including less than or equal to 8 PUCCH resources, which is configured through the high-level signaling, the index of the PUCCH resource for transmitting the HARQ-ACK information calculated by the terminal finally is PUCCH index, which is calculated as follows:

PUCCH index=$(\Delta_{PRI}$+UE index mod 8)mod 8, where, $\Delta_{PRI}$ is the value of the PUCCH resource indicator conveyed by the first information field in the DCI, and UE index is the index of the terminal.

Sixth Example

For the PUCCH resource set including more than 8 PUCCH resources, which is configured through the high-level signaling, the index of the PUCCH resource for transmitting the HARQ-ACK information calculated by the terminal finally is PUCCH index, which is calculated as follows:

PUCCH index=$(r_{PUCCH}$+UE index mod 32)mod 32, where $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil + & \text{if } \Delta_{PRI} \geq R_{PUCCH} \bmod 8 \\ R_{PUCCH} \bmod 8 & \end{cases}$$

where UE index is the index of the terminal, $N_{CCE,p}$ is the number of CCEs of the CORESET where the PDCCH received by the terminal is, $n_{CCE,p}$ is the index of the first CCE receiving the PDCCH, $\Delta_{PRI}$ is the value of the PUCCH resource indicator conveyed by the first information field in the DCI, and $R_{PUCCH}$ is the number of PUCCH resources included in the PUCCH resource set.

Seventh Example

For the PUCCH resource set including less than or equal to 8 PUCCH resources, which is configured through the high-level signaling, the index of the PUCCH resource for transmitting the HARQ-ACK information calculated by the terminal finally is PUCCH index, which is calculated as follows:

PUCCH index=$(\Delta P_{RI}$+UE index mod $N$)mod $N$, where $\Delta_{PRI}$ is the value of the PUCCH resource indicator conveyed by the first information field in the DCI, UE index is the index of the terminal, and N is the number of PUCCH resources in the PUCCH resource set configured through the high-level signaling.

Eighth Example

For the PUCCH resource set including more than 8 PUCCH resources, which is configured through the high-level signaling, the index of the PUCCH resource for transmitting the HARQ-ACK information calculated by the terminal finally is PUCCH index, which is calculated as follows:

PUCCH index=($r_{PUCCH}$+UE index mod N)mod N, where, $$r_{PUCCH} = \begin{cases} \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil + \\ \qquad R_{PUCCH} \bmod 8 & \text{if } \Delta_{PRI} \geq R_{PUCCH} \bmod 8 \end{cases}$$

where UE index is the index of the terminal, N is the number of PUCCH resources in the PUCCH resource set configured through the high-level signaling, $N_{CCE,p}$ is the number of CCEs of the CORESET in which the PDCCH received by the terminal is located, $n_{CCE,p}$ is the index of the first CCE receiving the PDCCH, $\Delta_{PRI}$ is the value of the PUCCH resource indicator conveyed by the first information field in the DCI, and $R_{PUCCH}$ is the number of PUCCH resources included in the PUCCH resource set.

Ninth Example

For the PUCCH resource set including less than or equal to 8 PUCCH resources, which is configured through the high-level signaling, the index of the PUCCH resource for transmitting the HARQ-ACK information calculated by the terminal finally is PUCCH index, which is calculated as follows:

PUCCH index=($\Delta_{PRI}$+offset value of index of PUCCH resource mod 8)mod 8, where $\Delta_{PRI}$ is the value of the PUCCH resource indicator conveyed by the first information field in the DCI.

Tenth Example

For the PUCCH resource set including more than 8 PUCCH resources, which is configured through the high-level signaling, the index of the PUCCH resource for transmitting the HARQ-ACK information calculated by the terminal finally is PUCCH index, which is calculated as follows:

PUCCH index=($r_{PUCCH}$+offset value of index of PUCCH resource mod 32)mod 32, where $$r_{PUCCH} = \begin{cases} \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil + \\ \qquad R_{PUCCH} \bmod 8 & \text{if } \Delta_{PRI} \geq R_{PUCCH} \bmod 8 \end{cases}$$

where $N_{CCE,p}$ is the number of CCEs of the CORESET in which the PDCCH received by the terminal is located, $n_{CCE,p}$ is the index of the first CCE receiving the PDCCH, $\Delta_{PRI}$ is the value of the PUCCH resource indicator conveyed by the first information field in the DCI, and $R_{PUCCH}$ is the number of PUCCH resources included in the PUCCH resource set.

Eleventh Example

For the PUCCH resource set including less than or equal to 8 PUCCH resources, which is configured through the high-level signaling, the index of the PUCCH resource for transmitting the HARQ-ACK information calculated by the terminal finally is PUCCH index, which is calculated as follows:

PUCCH index=($\Delta_{PRI}$+offset value of index of PUCCH resource mod N)mod N, where $\Delta_{PRI}$ is the value of the PUCCH resource indicator conveyed by the first information field in the DCI, and N is the number of PUCCH resources in the PUCCH resource set configured through the high-level signaling.

Twelfth Example

For the PUCCH resource set including more than 8 PUCCH resources, which is configured through the high-level signaling, the index of the PUCCH resource for transmitting the HARQ-ACK information calculated by the terminal finally is PUCCH index, which is calculated as follows:

PUCCH index=($r_{PUCCH}$+offset value of index of PUCCH resource mod N)mod N, where, $$r_{PUCCH} = \begin{cases} \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil + \\ \qquad R_{PUCCH} \bmod 8 & \text{if } \Delta_{PRI} \geq R_{PUCCH} \bmod 8 \end{cases}$$

where N is the number of PUCCH resources in the PUCCH resource set configured through the high-level signaling, $N_{CCE,p}$ is the number of CCEs of the CORESET in which the PDCCH received by the terminal is located, $n_{CCE,p}$ is the index of the first CCE receiving the PDCCH, $\Delta_{PRI}$ is the value of the PUCCH resource indicator conveyed by the first information field in the DCI, and $R_{PUCCH}$ is the number of PUCCH resources included in the PUCCH resource set.

Thirteenth Example

The DCI includes the first information field, and the first information field includes one PUCCH resource indicator.

The terminal first selects which PUCCH resource set to use according to its own UCI load, and then, determines which PUCCH resource in the selected PUCCH resource set to use according to the indication of the PUCCH resource indicator of the first information field of the DCI of the received PDCCH.

Or, the terminal selects a PUCCH resource from the PUCCH resource set configured by the network side according to the PUCCH resource indicator.

In the embodiments of the present disclosure, the network side may configure different PUCCH resource sets for different terminals, even though different terminals read the same PUCCH resource indicator, and because the PUCCH resource sets of different terminals are different, the conflict of the PUCCH resources of different terminals can be avoided.

As an optional embodiment, the method may further include the following operation.

At least two sets of downlink configuration information which are configured for the terminal by the network side device through the high-level signaling are received. The downlink configuration information includes: the downlink DMRS configuration information and/or the PDSCH configuration information.

The at least two sets of downlink configuration information include:

the downlink configuration information applicable to the PDSCH scheduled by the DCI, of which CRC is scrambled by the first RNTI, which may also be referred to as the downlink configuration information applicable to the multicast or broadcast service; and the downlink configuration information applicable to the PDSCH scheduled by the DCI, of which the CRC is scrambled by an RNTI other than the first RNTI, which may also be referred to as the downlink configuration information applicable to the unicast service.

For example, the network side device configures two sets of downlink DMRS configuration information for the terminal through the high-level signaling. The length of the DMRS in the first set of downlink DMRS configuration information is two symbols, an additional DMRS is configured, and the first set of downlink DMRS configuration information is applicable to the PDSCH scheduled by the DCI, of which CRC is scrambled by the first RNTI. The length of the DMRS in the second set of downlink DMRS configuration information is one symbol, no additional DMRS is configured, and the second set of downlink DMRS configuration information is applicable to the PDSCH scheduled by the DCI, the CRC of which is scrambled by other RNTIs (such as the C-RNTI) except the first RNTI.

To sum up, in the above embodiments of the present disclosure, the indication of the PUCCH resources of multiple terminals is realized through one piece of DCI, and the network side does not need to configure the PUCCH resource set with orthogonal resources for multiple terminals, and meanwhile, the conflict of PUCCH feedback resources of the terminals can be avoided.

Figure 3:
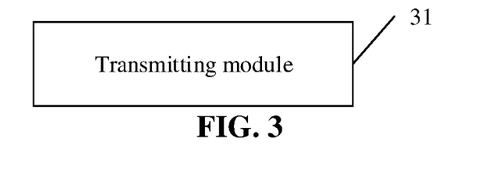
FIG. 3 illustrates a structural schematic diagram of a resource indication apparatus according to an embodiment of the present disclosure.

As shown in FIG. 3, the embodiments of the present disclosure also provide a resource indication apparatus, which is applied to a network side device, and may include: a transmitting module 31.

The transmitting module 31 is configured to transmit the DCI.

The DCI is used for indicating a PUCCH resource for transmitting HARQ-ACK information for at least two terminals.

Optionally, in the above embodiments of the present disclosure, the CRC of the DCI is scrambled by the first RNTI. The first RNTI is the common parameter of at least two terminals that receive the DCI.

The DCI includes the first information field, the first information field includes at least two PUCCH resource indicators, and each of the PUCCH resource indicators is used for indicating the PUCCH resource of a respective one of the terminals.

Optionally, in the above embodiments of the present disclosure, the apparatus may further include a first configuring module.

The first configuring module is configured to configure for the terminal the position of the PUCCH resource indicator of the terminal in the first information field through the high-level signaling.

Optionally, in the above embodiments of the present disclosure, the DCI further includes a second information field, and the second information field conveys at least two PUCCH transmission power control commands Each of the PUCCH transmission power control commands corresponds to a PUCCH resource indicated by a respective one of the PUCCH resource indicators in the first information field.

Optionally, in the above embodiments of the present disclosure, the DCI includes the first information field, and the first information field includes one PUCCH resource indicator.

Optionally, in the above embodiments of the present disclosure, the apparatus may further include a second configuring module.

The second configuring module is configured to configure the first parameter for the terminal. The first parameter is used for assisting the terminal in determining the PUCCH resource for transmitting the HARQ-ACK information.

Optionally, in the above embodiments of the present disclosure, the first parameter includes any one of the following:

the identity information of the terminal;
the index of the terminal; or
the offset value of the index of the PUCCH resource of the terminal to the index of the PUCCH resource indicated by the PUCCH resource indicator conveyed by the first information field in the DCI.

Optionally, in the above embodiments of the present disclosure, the apparatus may further include a third configuring module.

The third configuring module is configured to configure at least two sets of downlink configuration information for the terminal through the high-level signaling. The downlink configuration information includes: the downlink DMRS configuration information and/or the PDSCH configuration information.

The at least two sets of downlink configuration information include:

the downlink configuration information applicable to the PDSCH scheduled by the DCI, of which CRC is scrambled by the first RNTI; and the downlink configuration information applicable to the PDSCH scheduled by the DCI, of which the CRC is scrambled by an RNTI other than the first RNTI.

To sum up, in the above embodiments of the present disclosure, the indication of the PUCCH resources of multiple terminals is realized through one piece of DCI, and the network side does not need to configure the PUCCH resource set with orthogonal resources for multiple terminals, and meanwhile, the conflict of PUCCH feedback resources of the terminals can be avoided.

It is to be noted that the resource indication apparatus which is applied to the network side device and provided by the embodiments of the present disclosure is an apparatus that can perform the resource indication method which is applied to the network side device, so all embodiments of the resource indication method applied to the network side device are applicable to the apparatus and can achieve the same or similar beneficial effects.

Figure 4:
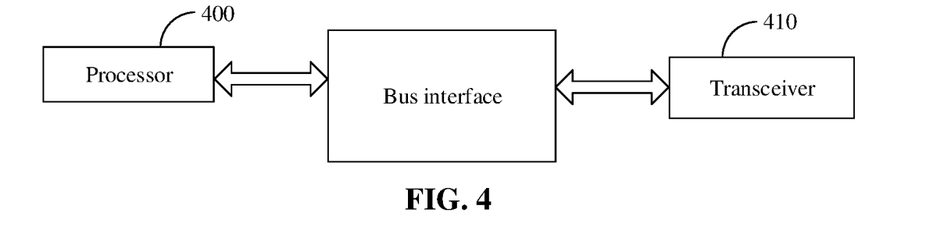
FIG. 4 illustrates a structural schematic diagram of a network side device according to an embodiment of the present disclosure.

As show in FIG. 4, the embodiments of the present disclosure also provide a network side device, which may include a processor 400 and a transceiver 410. The transceiver 410 is configured to receive and transmit data under control of the processor 400. The processor 400 is configured to perform the following operations.

The DCI is transmitted.

The DCI is used for indicating PUCCH resource for transmitting HARQ-ACK information for at least two terminals.

Optionally, in the above embodiments of the present disclosure, the CRC of the DCI is scrambled by the first RNTI. The first RNTI is the common parameter of at least two terminals that receive the DCI.

Optionally, in the above embodiments of the present disclosure, the DCI includes the first information field, the first information field includes at least two PUCCH resource indicators, and each of the PUCCH resource indicators is used for indicating the PUCCH resource of a respective one of the terminals.

Optionally, in the above embodiments of the present disclosure, the processor is further configured to:
configure for the terminal the position of the PUCCH resource indicator of the terminal in the first information field through high-level signaling.

Optionally, in the above embodiments of the present disclosure, the DCI also includes the second information field, and the second information field conveys at least two PUCCH transmission power control commands Each of the PUCCH transmission power control commands corresponds to a PUCCH resource indicated by a respective one of the PUCCH resource indicators in the first information field.

Optionally, in the above embodiments of the present disclosure, the DCI includes the first information field, and the first information field includes a PUCCH resource indicator.

Optionally, in the above embodiments of the present disclosure, the processor is further configured to:
configure the first parameter for the terminal. The first parameter is used for assisting the terminal in determining the PUCCH resource for transmitting the HARQ-ACK information.

Optionally, in the above embodiments of the present disclosure, the first parameter includes any one of the following:
the identity information of the terminal;
the index of the terminal; or
the offset value of the index of the PUCCH resource of the terminal to the index of the PUCCH resource indicated by the PUCCH resource indicator conveyed by the first information field in the DCI.

Optionally, in the above embodiments of the present disclosure, the processor is further configured to:
configure at least two sets of downlink configuration information for the terminal through the high-level signaling. The downlink configuration information includes: the downlink DMRS configuration information and/or the PDSCH configuration information.

The at least two sets of downlink configuration information include:
the downlink configuration information applicable to the PDSCH scheduled by the DCI, of which CRC is scrambled by the first RNTI; and
the downlink configuration information applicable to the PDSCH scheduled by the DCI, of which the CRC is scrambled by an RNTI other than the first RNTI.

To sum up, in the above embodiments of the present disclosure, the indication of the PUCCH resources of multiple terminals is realized through one piece of DCI, and the network side does not need to configure the PUCCH resource set with orthogonal resources for multiple terminals, at the same time, the conflict of PUCCH feedback resources of the terminals can be avoided.

It is to be noted that the network side device provided by the embodiments of the present disclosure is a network side device that can perform the resource indication method which is applied to the network side device, so all embodiments of the resource indication method applied to the network side device are applicable to the network side device and can achieve the same or similar beneficial effects.

The embodiments of the present disclosure also provide a communication device. The communication device is a network side device, which may include a memory, a processor and a computer program stored in the memory and capable of running on the processor. When executing the program, the processor implements each process in the above embodiments of the resource indication method and can achieve the same technical effects. For avoiding repetitions, elaborations are omitted herein.

The embodiments of the present disclosure also provide a computer-readable storage medium, in which a computer program is stored. When executed by the processor, the program implements each process in the above embodiments of the resource indication method and can achieve the same technical effects. For avoiding repetitions, elaborations are omitted herein. The computer-readable storage medium is a Read-Only Memory (ROM), a Random Access Memory (RAM), a magnetic disk or an optical disc, etc.

Figure 5:
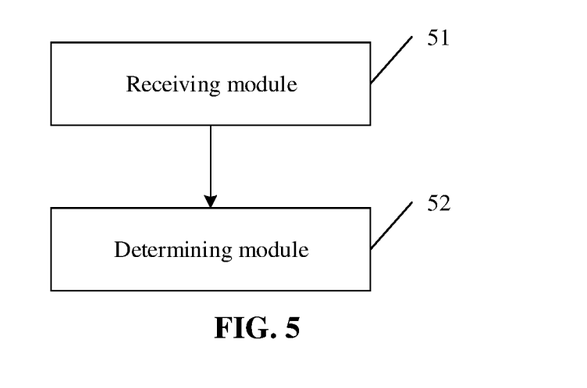
FIG. 5 illustrates a structural schematic diagram of a resource determination apparatus according to an embodiment of the present disclosure.
Figure 6:
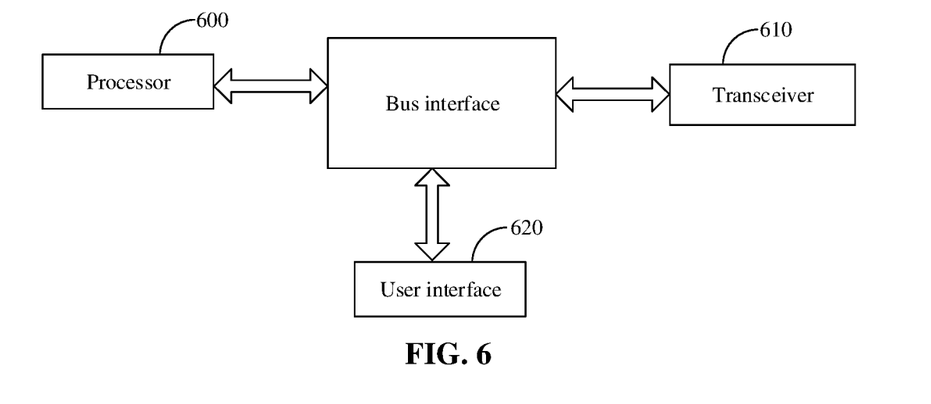
FIG. 6 illustrates a structural schematic diagram of a terminal according to an embodiment of the present disclosure.

As shown in FIG. 5, the embodiments of the present disclosure also provide a resource determination apparatus, which is applied to a terminal, and may include: a receiving module 51 and a determining module 52.

The receiving module 51 is configured to receive the DCI. The DCI is used for indicating PUCCH resource for transmitting HARQ-ACK information for at least two terminals.

The determining module 52 is configured to determine the PUCCH resource for transmitting the HARQ-ACK information according to the DCI.

Optionally, in the above embodiments of the present disclosure, the CRC of the DCI is scrambled by the first RNTI. The first RNTI is the common parameter of at least two terminals that receive the DCI.

Optionally, in the above embodiments of the present disclosure, the DCI includes the first information field, the first information field includes at least two PUCCH resource indicators, and each of the PUCCH resource indicators is used for indicating the PUCCH resource of a respective one of the terminals.

Optionally, in the above embodiments of the present disclosure, the apparatus may also include: a first receiving module.

The first receiving module is configured to receive the position of the PUCCH resource indicator of the terminal in the first information field, which is configured by the network side device through the high-level signaling.

Optionally, in the above embodiments of the present disclosure, the determining module may include: a first determining submodule and a second determining submodule.

The first determining submodule is configured to determine the PUCCH resource indicator of the terminal in the DCI according to the position of the PUCCH resource indicator of the terminal in the first information field which is configured by the network side device.

The second determining submodule is configured to determine the PUCCH resource of the terminal according to the PUCCH resource indicator of the terminal.

Optionally, in the above embodiments of the present disclosure, the DCI further includes the second information field, and the second information field conveys at least two PUCCH transmission power control commands Each of the PUCCH transmission power control commands corresponds to a PUCCH resource indicated by a respective one of the PUCCH resource indicators in the first information field.

Optionally, in the above embodiments of the present disclosure, the DCI includes the first information field, and the first information field includes one PUCCH resource indicator.

Optionally, in the above embodiments of the present disclosure, the determining module may include: a third determining submodule.

The third determining submodule is configured to determine the PUCCH resource for transmitting the HARQ-ACK information of the terminal according to the PUCCH resource indicator of the first information field.

Optionally, in the above embodiments of the present disclosure, the apparatus may further include a second receiving module.

The second receiving module is configured to receive the first parameter of the terminal which is configured for the terminal by the network side device. The first parameter is used for assisting the terminal in determining the PUCCH resource for transmitting the HARQ-ACK information.

Optionally, in the above embodiments of the present disclosure, the first parameter includes any one of the following:
the identity information of the terminal;
the index of the terminal; or
the offset value of the index of the PUCCH resource of the terminal to the index of the PUCCH resource indicated by the PUCCH resource indicator conveyed by the first information field in the DCI.

Optionally, in the above embodiments of the present disclosure, the determining module may include: a fourth determining submodule.

The invention claimed is:

1. A resource indication method, applied to a network side device, comprising:
   transmitting Downlink Control Information (DCI);
   wherein the DCI is used for indicating Physical Uplink Control Channel (PUCCH) resource for transmitting Hybrid Automatic Repeat reQuest (HARQ)-Acknowledgement (ACK) information for at least two terminals;
   wherein the DCI comprises a first information field, the first information field comprises at least two PUCCH resource indicators, and each of the at least two PUCCH resource indicators is used for indicating the PUCCH resource for a respective one of the at least two terminals;
   wherein the method further comprises: configuring for each of the at least two terminals a position of a corresponding one the at least two PUCCH resource indicators of the respective one of the at least two terminals in the first information field through high-level signaling; and
   wherein the DCI further comprises a second information field, and the second information field conveys at least two PUCCH transmission power control commands, wherein each of the at least two PUCCH transmission power control commands corresponds to a PUCCH resource indicated by a respective one of the at least two PUCCH resource indicators in the first information field.

2. The method of claim 1, wherein Cyclic Redundancy Check (CRC) of the DCI is scrambled by a first Radio Network Temporary Identifier (RNTI), wherein the first RNTI is a common parameter of the at least two terminals that receive the DCI.

3. The method of claim 2, further comprising:
   configuring at least two sets of downlink configuration information for each of the at least two terminals through the high-level signaling, wherein the downlink configuration information comprises at least one of: downlink Demodulation Reference Signal (DMRS) configuration information or Physical Downlink Shared Channel (PDSCH) configuration information;
   wherein the at least two sets of downlink configuration information comprise:
   downlink configuration information applicable to a PDSCH scheduled by the DCI, of which CRC is scrambled by the first RNTI; and
   downlink configuration information applicable to the PDSCH scheduled by the DCI, of which the CRC is scrambled by an RNTI other than the first RNTI.

4. A resource determination method, applied to a terminal, the method comprising:
   receiving Downlink Control Information (DCI), wherein the DCI is used for indicating Physical Uplink Control Channel (PUCCH) resource for transmitting Hybrid Automatic Repeat reQuest (HARQ)-Acknowledgement (ACK) information for at least two terminals; and
   determining the PUCCH resource for transmitting the HARQ-ACK information according to the DCI;
   wherein the DCI comprises a first information field, the first information field comprises at least two PUCCH resource indicators, and each of the at least two PUCCH resource indicators is used for indicating a PUCCH resource of a respective one of the at least two terminals;
   the method further comprises:
   receiving a position of a PUCCH resource indicator of the terminal from the at least two PUCCH resource indicators in the first information field, which is configured by a network side device through high-level signaling; and
   wherein the DCI further comprises a second information field, and the second information field conveys at least two PUCCH transmission power control commands, wherein each of the at least two PUCCH transmission power control command corresponds to a PUCCH resource indicated by a respective one of the at least two PUCCH resource indicators in the first information field.

5. The method of claim 4, wherein Cyclic Redundancy Check (CRC) of the DCI is scrambled by a first Radio Network Temporary Identifier (RNTI), wherein the first RNTI is a common parameter of the at least two terminals that receive the DCI.

6. The method of claim 4,
wherein determining the PUCCH resource for transmitting the HARQ-ACK information according to the DCI comprises:
  determining the PUCCH resource indicator of the terminal in the DCI, according to the position of the PUCCH resource indicator of the terminal in the first information field which is configured by the network side device; and
  determining the PUCCH resource of the terminal, according to the PUCCH resource indicator of the terminal.

7. The method of claim 5, further comprising:
receiving at least two sets of downlink configuration information which are configured for the terminal by the network side device through the high-level signaling, wherein the downlink configuration information comprises at least one of: downlink Demodulation Reference Signal (DMRS) configuration information or Physical Downlink Shared Channel (PDSCH) configuration information;
wherein the at least two sets of downlink configuration information comprise:
  downlink configuration information applicable to a PDSCH scheduled by the DCI, of which CRC is scrambled by the first RNTI; and
  downlink configuration information applicable to the PDSCH scheduled by the DCI, of which the CRC is scrambled by an RNTI other than the first RNTI.

8. A network side device, comprising a processor and a transceiver, wherein the transceiver is configured to receive and transmit data under control of the processor, and the processor is configured to perform the following operations:
  transmitting Downlink Control Information (DCI);
  wherein the DCI is used for indicating Physical Uplink Control Channel (PUCCH) resource for transmitting Hybrid Automatic Repeat reQuest (HARQ)-Acknowledgement (ACK) information for at least two terminals;
  wherein the DCI comprises a first information field, the first information field comprises at least two PUCCH resource indicators, and each of the at least two PUCCH resource indicators is used for indicating the PUCCH resource for a respective one of the at least two terminals;
  wherein the processor is configured to perform the following operation: configuring for each of the at least two terminals a position of a corresponding one of the at least two PUCCH resource indicators of the respective one of the at least two terminals in the first information field through high-level signaling; and
  wherein the DCI further comprises a second information field, and the second information field conveys at least two PUCCH transmission power control commands, wherein each of the at least two PUCCH transmission power control commands corresponds to a PUCCH resource indicated by a respective one of the at least two PUCCH resource indicators in the first information field.

9. A terminal, comprising a processor and a transceiver, wherein the transceiver is configured to receive and transmit data under control of the processor, and the processor is configured to perform the method of claim 4.

* * * * *